US012671113B2

(12) United States Patent
Kang et al.

(10) Patent No.: US 12,671,113 B2
(45) Date of Patent: Jun. 30, 2026

(54) NON-AQUEOUS ELECTROLYTE SOLUTION CONTAINING A FIRST ADDITIVE OF ISOCYANATOBENZONITRILE AND A SECOND ADDITIVE AND LITHIUM SECONDARY BATTERY INCLUDING THE SAME

(71) Applicant: LG Energy Solution, Ltd., Seoul (KR)

(72) Inventors: Yoo Sun Kang, Daejeon (KR); Jeong Woo Oh, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 762 days.

(21) Appl. No.: 17/914,588

(22) PCT Filed: Sep. 6, 2021

(86) PCT No.: PCT/KR2021/012024
§ 371 (c)(1),
(2) Date: Sep. 26, 2022

(87) PCT Pub. No.: WO2022/080669
PCT Pub. Date: Apr. 21, 2022

(65) Prior Publication Data

US 2023/0352735 A1 Nov. 2, 2023

(30) Foreign Application Priority Data

Oct. 13, 2020 (KR) ........................ 10-2020-0131541

(51) Int. Cl.
*H01M 6/16* (2006.01)
*H01M 10/052* (2010.01)
*H01M 10/0567* (2010.01)
*H01M 10/0569* (2010.01)

(52) U.S. Cl.
CPC ..... *H01M 10/0567* (2013.01); *H01M 10/052* (2013.01); *H01M 10/0569* (2013.01); *H01M 2300/0037* (2013.01)

(58) Field of Classification Search
CPC ......... H01M 10/0567; H01M 10/0566; H01M 10/0568; H01M 10/0569; H01M 2300/0037
See application file for complete search history.

(56) References Cited

U.S. PATENT DOCUMENTS

| | | | |
|---|---|---|---|
| 2011/0207000 A1* | 8/2011 | Jow ....................... | H01M 4/133 429/188 |
| 2015/0079463 A1 | 3/2015 | Yamamoto et al. | |
| 2016/0000607 A1 | 1/2016 | Bamberg | |
| 2016/0006076 A1 | 1/2016 | Kim et al. | |
| 2017/0018803 A1* | 1/2017 | Wang ................ | H01M 10/0525 |
| 2018/0048017 A1 | 2/2018 | Jilek et al. | |
| 2021/0036365 A1 | 2/2021 | Kim et al. | |
| 2021/0203000 A1 | 7/2021 | Feng et al. | |
| 2021/0265662 A1 | 8/2021 | Kim et al. | |

FOREIGN PATENT DOCUMENTS

| | | | |
|---|---|---|---|
| CN | 102208682 | A | 10/2011 |
| CN | 109804487 | A | 5/2019 |
| CN | 110931869 | A | 3/2020 |
| CN | 110970658 | A | 4/2020 |
| CN | 111224160 | A | 6/2020 |
| CN | 111357144 | A | 6/2020 |
| EP | 2490292 | A1 | 8/2012 |
| JP | 2013243116 | A | 12/2013 |
| JP | 2016048624 | A | 4/2016 |
| JP | 6361232 | B2 | 7/2018 |
| JP | 2019528550 | A | 10/2019 |
| KR | 20070031807 | A | 3/2007 |
| KR | 20160004665 | A | 1/2016 |
| WO | 2019235883 | A1 | 12/2019 |
| WO | 2020009340 | A1 | 1/2020 |

OTHER PUBLICATIONS

Search report from International Application No. PCT/KR2021/012024, mailed Jan. 4, 2022.
Extended European Search Report including Written Opinion for Application No. 21880317.9 dated Aug. 16, 2024, pp. 1-9.

* cited by examiner

*Primary Examiner* — Raymond Alejandro
(74) *Attorney, Agent, or Firm* — Lerner David LLP

(57) ABSTRACT

The present disclosure related to a non-aqueous electrolyte solution for a lithium secondary battery, the non-aqueous electrolyte solution comprising:
a lithium salt;
an organic solvent; and
a first additive,
wherein the first additive is one or two of compounds represented by following chemical formula 1a and chemical formula 1b:

[Chemical formula 1a]

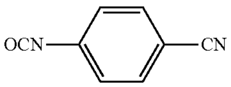

[Chemical formula 1b]

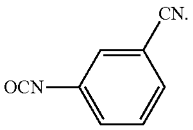

5 Claims, 1 Drawing Sheet

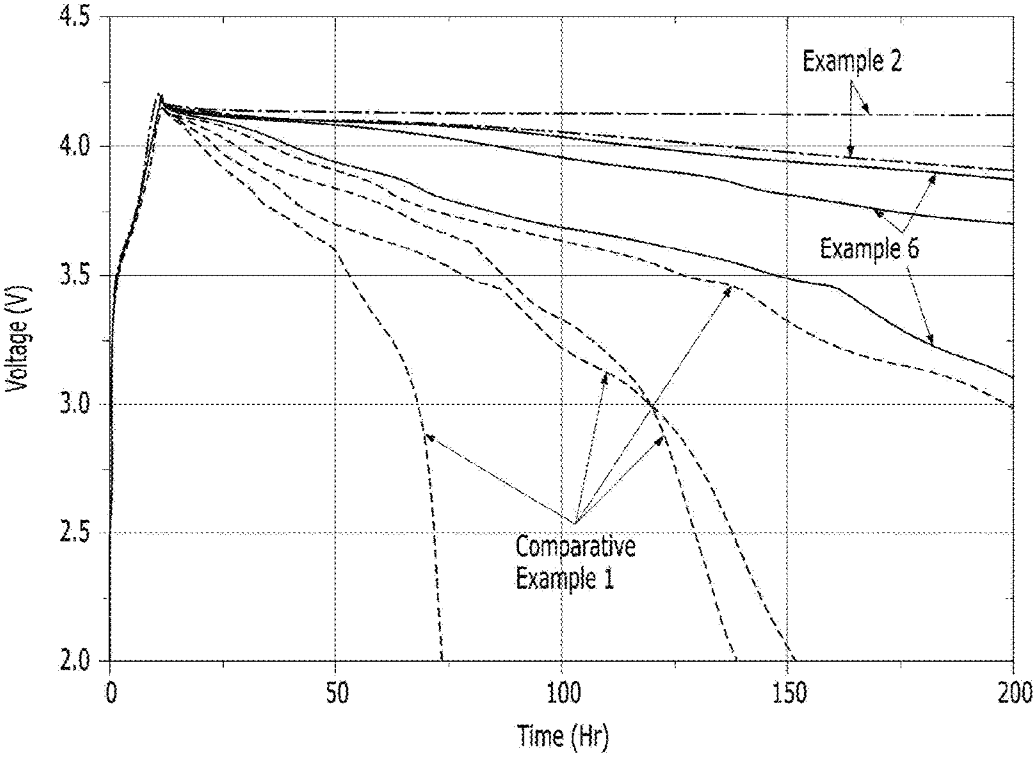
4.5
4.0
3.5
3.0
2.5
2.0
Voltage (V)
0
50
100
150
200
Time (Hr)
Example 2
Example 6
Comparative
Example 1

NON-AQUEOUS ELECTROLYTE SOLUTION CONTAINING A FIRST ADDITIVE OF ISOCYANATOBENZONITRILE AND A SECOND ADDITIVE AND LITHIUM SECONDARY BATTERY INCLUDING THE SAME

CROSS-REFERENCE TO RELATED APPLICATIONS

The present application is a national stage entry under 35 U.S.C. § 371 of International Application No. PCT/KR2021/012024 filed on Sep. 6, 2021, which claims priority from Korean Patent Application No. 10-2020-0131541 filed on Oct. 13, 2020, all the disclosures of which are incorporated herein by reference.

TECHNICAL FIELD

The present invention relates to a non-aqueous electrolyte solution for a lithium secondary battery, and a lithium secondary battery including the same.

BACKGROUND ART

Recently, the interest in developing energy storage technology is on the increase, and as the applied fields are expanded to mobile phones, camcorders and laptop PCs, and electric vehicles, efforts on the research and development of electrochemical elements are currently embodied.

Among electrochemical devices, the interest in the development of secondary batteries is on the increase, and particularly, lithium secondary batteries developed in 1990 s have been spotlighted with the advantages that the operating voltage is high and the energy density is large.

In the case of a lithium secondary battery system, unlike an initial period when lithium metal was directly applied to a system, a transition metal oxide containing lithium is used as the positive electrode material, and carbon-based materials such as graphite and alloy-based materials such as silicon are applied to the negative electrode as the negative electrode material. In this way, a system, in which lithium metal is not directly used in a battery, is currently implemented.

Such a lithium secondary battery is composed of a positive electrode composed of a transition metal oxide containing lithium, a negative electrode capable of storing lithium, an electrolyte solution used for transferring lithium ions, and a separator. Herein, the electrolyte solution is known as a component which significantly affects the stability and safety of the battery, and a lot of researches on the electrolyte solution are currently conducted.

An electrolyte solution for a lithium secondary battery is composed of a lithium salt, an organic solvent which dissolves the lithium salt, and a functional additive. Herein, in order to improve electrochemical characteristics of the battery, it is important to appropriately select these components. Examples of currently used lithium salt include $LiPF_6$, $LiBF_4$, LiFSI (lithium fluorosulfonyl imide, $LiN(SO_2F)_2$), LiTFSI (lithium(bis)trifluoromethanesulfonyl imide, $LiN(SO_2CF_3)_2$) or LiBOB (lithium bis(oxalate) borate, $LiB(C_2O_4)_2$), and examples of the organic solvent include a carbonate-based organic solvent, an ester-based organic solvent, or an ether-based organic solvent.

In the case of such a lithium secondary battery, the increase in the resistance and reduction in the capacity during the charge/discharge and storage at a high temperature are presented as a big problem in terms of deterioration of the performance. Herein, one of the causes of such a problem is side reaction occurring due to deterioration at a high temperature, particularly deterioration due to decomposition of salt at a high temperature. If the byproducts of salt are activated and then decompose the film formed on the surface of the positive electrode and the negative electrode terminal, the passivation capability of the film may drop, thereby causing additional decomposition of the electrolyte solution and self-discharge.

In the case of an electrode material of a lithium ion battery, particularly a negative electrode, a graphite-based negative electrode is usually used. In the case of graphite, the operation potential is equal to or less than 0.3V (vs. Li/Li+), and the currently used electrolyte solution is reduced and decomposed. Such a reduction-decomposed product allows lithium ions to be permeated, but the additional decomposition of the electrolyte solution forms a solid electrolyte interphase (SEI) film.

Further, if the SEI film fails to have a passivation capability enough to suppress additional decomposition of the electrolyte solution, the electrolyte solution is additionally decomposed during storage, and the charged graphite is self-discharged, thereby showing a phenomenon that the potential of the entire battery drops.

One of the elements, which can affect the passivation capability, HF and $PF_5$, which are generated by thermal decomposition of $LiPF_6$ which is a lithium salt. As the surface of an electrode or a film is deteriorated by the attack of such an acid, a transition metal is eluted in the positive electrode, by which the resistance increases, and the redox center is lost, which may decrease the capacity. Further, eluted metal ions are deposited on the negative electrode, and the irreversible capacity increases by consumption of electrons due to deposition of metal and additional electrolyte decomposition, thereby generating a cell capacity decrease and causing a resistance increase and self-discharge of a graphite negative electrode.

Korean Patent Publication No. 10-2016-0004665 discloses that a non-aqueous electrolyte solution, which contains a compound having a structure where functional groups of an isocyanate group and a nitrile group coexist in one molecule, shows an effect of suppressing a thickness change at a high temperature and cycle characteristics at a high voltage of a lithium secondary battery. However, a compound, which was used in the example of the above literature, did not show a satisfactory effect in terms of low voltage improvement.

As such, there is a need for a non-aqueous electrolyte solution which shows an effect in low voltage improvement by suppressing precipitation in the negative electrode by forming eluted transition metal ions and complex.

DISCLOSURE

Technical Problem

The present invention is believed to solve at least some of the above problems. For example, an aspect of the present invention provides a non-aqueous electrolyte solution for a lithium secondary battery capable of showing effects in low voltage improvement by suppressing transition metal precipitation in a negative electrode by being more strongly deposited on the surface of a positive electrode, and a lithium secondary battery including the non-aqueous electrolyte solution.

Technical Solution

A non-aqueous electrolyte solution according to the present invention for solving the above problems includes: a lithium salt; an organic solvent; and a first additive, wherein the first additive is one or two of compounds represented by following chemical formula 1a and chemical formula 1b:

[Chemical formula 1a]

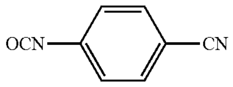

[Chemical formula 1b]

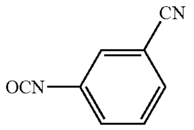

In an embodiment of the present invention, the first additive is a compound represented by chemical formula 1a.

In an embodiment of the present invention, an amount of the first additive contained in the electrolyte solution corresponds to 0.01 to 5 wt % of a total weight of the electrolyte solution, and preferably 0.1 to 3 wt % of the total weight of the electrolyte solution.

In an embodiment of the present invention, the non-aqueous electrolyte solution of the present invention may include a second additive, and the second additive includes at least one selected from the group consisting of halogen-substituted or unsubstituted cyclic carbonate compound, nitrile compound, phosphate compound, borate compound, sulfate compound, sultone compound, amine compound, silane compound, benzene compound and lithium compound. Preferably, the second additive may include vinylene carbonate and propane sultone, and more preferably, the second additive may further include $LiBF_4$.

In an embodiment of the present invention, an amount of the second additive contained in the electrolyte solution corresponds to 0.01 to 10 wt % of a total weight of the electrolyte solution.

In an embodiment of the present invention, the organic solvent includes one or a combination of two or more selected from the group consisting of a carbonate compound, an ether compound, an ester compound, a ketone compound, and an alcohol compound.

A lithium secondary battery of the present invention includes: a positive electrode; a negative electrode; a separator; and the above-described non-aqueous electrolyte solution for a lithium secondary battery.

Advantageous Effects

A first additive, which is contained in the non-aqueous electrolyte solution for a lithium secondary battery of the present invention, shows an effect of improving a low voltage by suppressing elution of a transition metal in a negative electrode by including an isocyanate group and is excellent in high voltage and high temperature characteristics.

BRIEF DESCRIPTION OF THE DRAWINGS

The FIGURE is graph showing the experimental result of metal elution suppressing evaluation.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

Non-Aqueous Electrolyte Solution for Lithium Secondary Battery

In an embodiment of the present invention, the present invention provides a non-aqueous electrolyte solution for a lithium secondary battery, including: a lithium salt; an organic solvent; and a first additive, in which the first additive is one or two of compounds represented by following chemical formula 1a and chemical formula 1b:

[Chemical formula 1a]

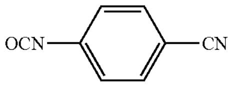

[Chemical formula 1b]

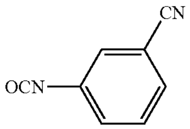

(1) Lithium Salt

In a non-aqueous electrolyte solution for a lithium secondary battery according to an embodiment of the present invention, a lithium salt, which is commonly used in an electrolyte solution for a lithium secondary battery may be used without limitation. For example, $Li^+$ is included as the cation of the lithium salt, and at least one selected from the group consisting of $F^-$, $Cl^-$, $Br^-$, $I^-$, $NO_3^-$, $N(CN)_2^-$, $ClO_4^-$, $BF_4^-$, $B_{10}Cl_{10}^-$, $PF_6^-$, $CF_3SO_3^-$, $CH_3CO_2^-$, $CF_3CO_2^-$, $AsF_6^-$, $SbF_6^-$, $AlCl_4^-$, $AlO_4^-$, $CH_3SO_3^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $SCN^-$ and $(CF_3CF_2SO_2)_2N^-$ may be included as the anion.

Specifically, the lithium salt may contain one or a combination of two or more selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, $LiCH_3SO_3$, LiFSI (lithium fluorosulfonyl imide, $LiN(SO_2F)_2$), LiTFSI (lithium (bis)trifluoromethanesulfonimide, $LiN(SO_2CF_3)_2$) and LiBETI (lithium bisperfluoroethanesulfonimide, $LiN(SO_2C_2F_5)_2$). More specifically, the lithium salt may contain one or a mixture of two or more selected from group consisting of $LiPF_6$, $LiBF_4$, $LiCH_3CO_2$, $LiCF_3CO_2$, $LiCH_3SO_3$, LiFSI, LiTFSI and $LiN(C_2F_5SO_2)_2$.

The lithium salt can be appropriately changed within a typically available range, but specifically, 0.1M to 3M lithium salt and more specifically 0.8M to 2.5M lithium salt may be included in the electrolyte solution. If the concentration of the lithium salt exceeds 3M, the viscosity of the non-aqueous electrolyte solution is increased, and the lithium ion transfer effect is lowered and the non-aqueous electrolyte solution wettability is lowered, so that it is difficult to form a SEI film having a uniform thickness on the surface of the electrode.

(2) Organic Solvent

The organic solvent may be minimized in decomposition by oxidation reaction during the charge/discharge of the secondary battery, and there is no limit to the kind of the organic solvent as long as it can show desired characteristics together with the additive. For example, a carbonate organic solvent, an ether organic solvent or an ester organic solvent, and the like can be used alone or in combination of two or more.

The carbonate organic solvent in the organic solvent may include at least one of a cyclic carbonate organic solvent and a linear carbonate organic solvent. Specifically, the cyclic carbonate-based organic solvent may include at least one selected from the group consisting of ethylene carbonate (EC), propylene carbonate (PC), 1,2-butylene carbonate, 2,3-butylene carbonate, 1,2-pentylalene carbonate, 2,3-pentylene carbonate, vinylene carbonate and fluoroethylene carbonate (FEC), and may specifically include a mixed solvent of ethylene carbonate having a high dielectric constant, and propylene carbonate having a relatively low melting point, compared to ethylene carbonate.

Further, the linear carbonate-based organic solvent is a solvent having a low viscosity and a low dielectric constant and may include at least one selected from the group consisting of dimethyl carbonate (DMC), diethyl carbonate (DEC), dipropyl carbonate, ethyl methyl carbonate (EMC), methylpropyl carbonate, and ethylpropyl carbonate, and may specifically include dimethyl carbonate (DMC).

In addition, as the ether-based organic solvent, any one selected from the group consisting of dimethyl ether, diethyl ether, dipropyl ether, methylethyl ether, methylpropyl ether, and ethylpropyl ether, or a mixture of two or more thereof may be used, but is not limited thereto.

Th ester-based organic solvent may be at least one selected from the group consisting of a linear ester-based organic solvent and a cyclic ester-based organic solvent.

At this time, one or a mixture of two or more selected from the group consisting of methyl acetate, ethyl acetate, propyl acetate, methyl propionate, ethyl propionate, propyl propionate, and butyl propionate may be used as the linear ester-based organic solvent, but the present invention is not limited to these examples.

One or a mixture of two or more selected from the group consisting of γ-butyrolactone, γ-valerolactone, γ-caprolactone, σ-valerolactone, and ϑ-caprolactone may be used as the cyclic ester-based organic solvent, but the present invention is not limited to these examples.

A cyclic carbonate-based organic solvent having a high viscosity capable of easily dissociating lithium salt in the electrolyte due to a high dielectric constant may be used as the organic solvent. Further, in order to manufacture an electrolyte having a higher electrical conductivity, a linear carbonate compound and a linear ester compound having a low viscosity and a low dielectric constant, such as dimethyl carbonate and diethyl carbonate, may be mixed together with the cyclic carbonate-based organic solvent at an appropriate ratio.

More specifically, the organic solvent may be obtained by mixing the cyclic carbonate compound with the linear carbonate compound, and the weight ratio of the cyclic carbonate compound and the linear carbonate compound may be in the range of 10:90 to 70:30.

(3) First Additive

Further, the non-aqueous electrolyte solution for a lithium secondary battery of the present invention contains one or two of compounds represented by chemical formula 1a and chemical formula 1b below.

[Chemical formula 1a]

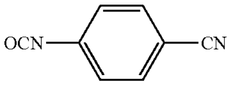

[Chemical formula 1b]

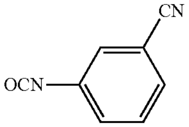

The functional group of the nitrile group contained in the compound represented by chemical formula 1a and chemical formula 1b may be strongly bonded with the surface of the positive electrode at a high temperature to form a complex, and the formed complex may act as a protective film for blocking the activated portion of the surface of the positive electrode and prevent a part of the transition metal from being eluted and precipitated in the negative electrode during charge/discharge and may suppress gas generation and side reaction occurring between the electrolyte solution and the positive electrode, thereby improving high temperature performance characteristics.

Further, the functional group of the isocyanate group contained in the compound represented by the chemical formula 1a or 1b is combined with a hydroxyl group existing on the surface of the negative electrode composed of carbons and silicon and may significantly improve the reliability at the time when a battery was preserved at a high temperature state for a long time.

As shown in chemical formula 2a and chemical formula 2b, it is known that compounds, which have a structure where functional groups of nitrile group and isocyanate group are substituted in some substituents of alkylene group of carbon number 1 to 10, have excellent high voltage and high temperature characteristics. However, the inventor of the present invention have found that the effects of suppressing self-discharge according to metal precipitation were much better when these functional groups substituted in a phenyl group are more strongly bonded on the surface of the positive electrode and form a complex with transition metal.

[Chemical formula 2a]

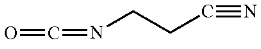

[Chemical formula 2b]

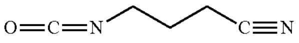

Further, in the first additive of the present invention, the low voltage suppressing effects are different depending on the position of the functional group of the nitrile group and the functional group of the isocyanate group. Specifically, the para-compound of chemical formula 1a where these functional groups are substituted at the 1, 4 position of the phenyl group shows more excellent effects of suppressing the low voltage than the metal compound of the chemical formula 1b where the functional groups are substituted at 1, 3 position of the phenyl group. Hence, in the present invention, the compound of the chemical formula 1a is preferably selected as the first additive.

In a specific example of the present invention, an amount of the first additive contained in the electrolyte solution corresponds to 0.01 to 5 wt %, preferably 0.1 to 3 wt %, and more preferably 0.3 to 1.5 wt % of a total weight of the electrolyte solution. When the content of the first additive is in the above range, secondary batteries having improved performance can be manufactured. For example, in the range, the effects of removing by-products and the effects of suppressing metal elution are excellent, and accordingly, it is possible to manufacture a secondary battery having improved a low voltage defect.

(3) Second Additive

The non-aqueous electrolyte solution of the present invention may further include a second additive which can form a stable film on the surface of the negative electrode and the positive electrode or suppress decomposition of a solvent in the non-aqueous electrolyte solution and act as a complementary element for improving mobility of lithium ions while not significantly increasing the initial resistance in addition to the effects of the first additive by being used together with the first additive.

Any additive for forming an SEI film capable of forming a stable film on the surface of the positive electrode and the negative electrode terminal may be used as the second additive.

Specifically, examples of the additive for forming the SEI film may include at least one selected from the group consisting of halogen-substituted or unsubstituted cyclic carbonate compound, nitrile compound, phosphate compound, borate compound, sulfate compound, sultone compound, amine compound, silane compound, benzene compound and lithium compound.

Specifically, the halogen-substituted cyclic carbonate compound or the halogen-unsubstituted cyclic carbonate compound may improve durability of the battery by forming a stable SEI film on the surface of the negative electrode during battery activation.

Fluoroethylene carbonate (FEC) may be used as the halogen-substituted cyclic carbonate compound, and vinylene carbonate (VC) or vinyl ethylene carbonate may be as the halogen-unsubstituted cyclic carbonate compound.

The content of the halogen-substituted cyclic carbonate compound or the halogen-unsubstituted cyclic carbonate compound may correspond to 5 wt % of the total weight of the non-aqueous electrolyte solution. When the content of the cyclic carbonate compound in the non-aqueous electrolyte solution exceeds 5 wt %, the cell swelling suppressing performance and initial resistance may be deteriorated.

When the nitrile compound is used together with the above-described mixed additive, effects of improvement of high temperature characteristics, etc. can be expected by positive/negative electrode film stabilization. Namely, it may act as a supplementary element in forming a negative electrode SEI film, suppress decomposition of a solvent in the electrolyte, and improve mobility of lithium ions. Examples of the nitrile compound may include at least one selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, 4-fluorophenylacetonitrile, 1,4-dicyano-2-butene, glutaronitrile, 1,3,6-hexanetricarbonitrile, and pimelonitrile.

The content of the nitrile compound may correspond to 8 or less wt % of the total weight of the non-aqueous electrolyte solution. When the total content of the nitrile compound in the non-aqueous electrolyte solution exceeds 8 wt %, the resistance increases due to the increase of the film formed on the surface of the electrode, thereby deteriorating the performance of the battery.

Further, since the phosphate compound stabilizes $PF^{6-}$ anions in the electrolyte solution and helps formation of a positive electrode and negative electrode film, thereby improving durability of the battery. Some examples of the phosphate-based compounds may include at least one selected from the group consisting of lithium difluorophosphate (LiDFP, $LiPO_2F_2$), lithium tetramethyl trimethyl silyl phosphate, trimethyl silyl phosphite (TMSPi), trimethyl silyl phosphate (TMSPa), ethyl di(prop-2-yn-1-yl)phosphate, allyl diphosphate, tris(2,2,2-trifluoroethyl) phosphate (TFEPa) and tris(trifluoroethyl) phosphite, and the content of the phosphate-based compound may correspond to 3 or less wt % of the total weight of the non-aqueous electrolyte solution.

The borate compound may improve mobility of the lithium ions by promoting ion pair separation, lower the interface resistance of the SEI film, and may solve problems such as hydrofluoric acid gas generation by dissociating materials such as LiF, which are generated during battery reaction and are not easily separated. LiBOB, $LiB(C_2O_4)_2$, lithium oxalyldifluoroborate, or tetramethyl trimethylsilylborate (TMSB) may be used as the borate compound, and the content of the borate compound may be equal to or less than 3 wt % of the total weight of the non-aqueous electrolyte solution.

At least one compound selected from the group consisting of 1,3-propane sultone (PS), 1,4-butene sultone, ethane sultone, 1,3-propene sultone, and 1-methyl-1,3-propene sultone may be used as the sultone compound, and the content of the sultone compound may be in the range of 0.3 to 5 wt % and specifically 1 to 5 wt % of the total weight of the non-aqueous electrolyte solution. When the content of the sultone-based compound in the non-aqueous electrolyte solution exceeds 5 wt %, an excessively thick film may be formed on the surface of the electrode, thereby increasing the resistance and deteriorating the output, and the resistance may increase by a large amount of additives in the non-aqueous electrolyte solution, thereby deteriorating the output characteristics.

The sulfate-based compound is a material which may be electrically decomposed and may form a stable SEI film even at high temperature storage, and some examples thereof include ethylene sulfate (Esa), trimethylene sulfate (TMS), or methyltrimethylene sulfate (MTMS).

Triethanolamine or ethylene diamine may be used as the amine compound, and tetravinylsilane may be used as the silane compound.

Monofluorobenzene (hereinafter, referred to as "fluorobenzene"), difluorobenzene, trifluorobenzene, tetrafluorobenzene, etc. may be used as the benzene compound.

Further, the lithium salt-based compound is a compound which is different from a lithium salt contained in the non-aqueous electrolyte solution. Some examples of the lithium salt-based compound include one or more selected from the group consisting of lithium methylsulfate, lithium ethylsulfate, lithium 2-trifluoromethyl-4,5-dicyanoimidazole, lithium tetrafluorooxalatophosphate, LiODFB and $LiBF_4$, and the content of the lithium salt-based compound may be equal to or less than 3 wt % of the total weight of the non-aqueous electrolyte solution.

Two or more kinds of the second additives can be mixed and used, the content of the second additives may correspond to 15 or less wt %, preferably 0.01 to 10 wt %, and more preferably 0.1 to 5.0 wt % of the total weight of the electrolyte solution.

When the content of the second additive is less than 0.01 wt %, high temperature storage characteristics and gas reduction effects, which are intended to be implemented from the additive, are very weak, and if the content of the second additive exceeds 15 wt %, the side reaction may excessively occur. In particular, when a large amount of second additives are added, they may not be sufficiently decomposed and may remain in a precipitated or unreacted state in the electrolyte solution at a room temperature. As such, the resistance increases, and the lifespan characteristics of the secondary battery may be deteriorated.

Lithium Secondary Battery

Further, in an embodiment of the present invention, a lithium secondary battery including a non-aqueous electrolyte solution for a secondary battery of the present invention is provided.

The lithium secondary battery of the present invention can be manufactured by injecting the non-aqueous electrolyte solution of the present invention into an electrode assembly which is obtained as a positive electrode, a negative electrode, and a separator interposed between the positive electrode and the negative electrode are sequentially laminated. At this time, a positive electrode, a negative electrode and a separator, which have been commonly used in manufacturing a lithium secondary battery, may be used as the positive electrode, the negative electrode, and the separator which form an electrode assembly.

Further, the positive electrode and the negative electrode, which form a lithium secondary battery of the present invention, can be manufactured in a general method and used.

(1) Positive Electrode

The positive electrode may be manufactured by forming a positive electrode mixture layer on a positive electrode current collector. The positive electrode mixture layer can be formed by coating a positive electrode slurry, which includes a positive electrode active material, a binder, a conductive material, and a solvent, on a positive electrode current collector, and then drying the slurry and rolling the positive electrode current collector.

The positive electrode current collector is not particularly limited as long as it has conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like.

The positive electrode active material is a compound capable of reversible intercalation and deintercalation of lithium, and may specifically include a lithium metal oxide containing lithium and at least one metal such as cobalt, manganese, nickel or aluminum. Specifically, some examples of the lithium metal oxide may include lithium-nickel-manganese-cobalt-based oxide (e.g., $Li(Ni_pCo_qMn_{r1})O_2$ (herein, 0<p<1, 0<q<1, 0<r1<1, p+q+r1=1), or $Li(Ni_{p1}Co_{q1}Mn_{r2})O_4$ (herein, 0<p1<2, 0<q1<2, 0<r2<2, p1+q1+r2=2), etc.), or lithium-nickel-cobalt-transition metal (M) oxide (e.g., $Li(Ni_{p2}Co_{q2}Mn_{r3}M_{S2})O_2$ (herein, M is one selected from the group consisting of Al, Fe, V, Cr, Ti, Ta, Mg and Mo, and p2, q2, r3 and s2 are atomic fractions of respectively independent elements, and 0<p2<1, 0<q2<1, 0<r3<1, 0<s2<1, p2+q2+r3+s2=1), etc.).

Examples of the positive electrode active material may include $Li(Ni_{1/3}Mn_{1/3}Co_{1/3})O_2$, $Li(Ni_{0.35}Mn_{0.28}Co_{0.37})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $Li(Ni_{0.8}Mn_{0.1}Co_{0.1})O_2$ or $Li(Ni_{0.8}Co_{0.15}Al_{0.05})O_2$.

The content of the positive electrode active material may correspond to 90 to 99 wt % and specifically 93 to 98 wt % of the total weight of solids in the positive electrode slurry.

The binder is added in an amount of 1 to 30% by weight, on the basis of the total weight of solids in the positive electrode slurry, as a component that assists in bonding between the active material and the conductive material and bonding to the current collector. Examples of such binders include polyvinylidene fluoride, polyvinyl alcohol, carboxymethylcellulose, starch, hydroxypropylcellulose, regenerated cellulose, polyvinylpyrrolidone, tetrafluoroethylene, polyethylene, polypropylene, ethylene-propylene-diene terpolymer, sulfonated ethylene-propylene-diene terpolymer, styrene butadiene rubber, fluorine rubber, and various copolymers.

Such a conductive material is not particularly limited as long as it has electrical conductivity without causing a chemical change in the battery, and examples thereof include: carbon powders such as carbon black, acetylene black, Ketjen black, channel black, furnace black, lamp black, or thermal black; graphite powders such as natural graphite or artificial graphite, or graphite, of which the crystal structure has been very much developed; conductive fibers such as carbon fiber and metal fiber; conductive powders such as carbon fluoride, aluminum and nickel powder; conductive whiskey such as zinc oxide and potassium titanate; conductive metal oxides such as titanium oxide; and conductive materials such as polyphenylene derivatives and the like.

The conductive material is usually added in an amount of 1 to 30% by weight based on the total weight of solids in the positive electrode slurry.

The solvent may include an organic solvent such as NMP (N-methyl-2-pyrrolidone), and may be used in an amount that becomes a desirable viscosity when the positive electrode active material and optionally a binder and a conductive material are included. For example, the concentration of the solids in the slurry containing the positive electrode active material and, optionally, the binder and the conductive material may be in an amount of 10 wt % to 70 wt %, preferably 20 wt % to 60 wt %.

(2) Negative Electrode

The negative electrode may be manufactured by forming a negative electrode mixture layer on a negative electrode current collector. The negative electrode mixture layer may be formed by coating a slurry including a negative electrode active material, a binder, a conductive material, a solvent, and the like on a negative electrode current collector, followed by drying and rolling.

The negative electrode current collector is generally made to a thickness of 3 to 500 micrometers. The negative electrode current collector is not particularly limited as long as it has high electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

Further, the negative electrode active material may include at least one selected from the group consisting of lithium metal, a carbon material capable of reversibly intercalating/deintercalating lithium ions, metal or an alloy of a metal and lithium, a metal oxide, a material capable of doping and dedoping lithium, and a transition metal oxide.

Any carbon-based negative electrode active material, which is generally used in a lithium ion secondary battery, may be used as a carbon material capable of reversibly intercalating/deintercalating the lithium ions, and representative examples thereof may include crystalline carbon, amorphous carbon, or a combination thereof. Some examples of the crystalline carbon may include amorphous, flaky, spherical, or fibrous natural graphite or artificial graphite, and some examples of the amorphous carbon may include soft carbon, hard carbon, mesophase pitch carbide, and calcined coke.

A metal selected from the group consisting of Cu, Ni, Na, K, Rb, Cs, Fr, Be, Mg, Ca, Sr, Si, Sb, Pb, In, Zn, Ba, Ra, Ge, Al and Sn, or an alloy of lithium and these metals may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3(0\leq x\leq 1)$, $Li_xWO_2(0\leq x\leq 1)$, and $Sn_xMe_{1-x}Me'_yO_z$ (Me: Mn, Fe, Pb, Ge; Me': Al, B, P, Si, group 1, group 2 and group 3 elements of the periodic table, halogen; $0<x\leq 1$; $1\leq y\leq 3$; $1\leq z\leq 8$) may be used as the metal oxide.

Some examples of materials capable of doping and dedoping the lithium may include Si, $SiO_x(0<x\leq 2)$, Si—Y alloy (Y is one selected from the group consisting of alkali metal, alkali earth metal, group 13 element, group 14 element, transition metal, rare earth element, and is not Si), Sn, $SnO_2$, Sn—Y (Y is one selected from the group consisting of alkali metal, alkali earth metal, group 13 element, group 14 element, transition metal, rare earth element, and is not Sn), and at least one of them may be mixed with $SiO_2$. One selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof may be used as the element Y.

Examples of the transition metal oxide include lithium-containing titanium oxide (LTO), vanadium oxide, lithium vanadium oxide, and the like.

The negative electrode active material may be included in 80% by weight to 99% by weight based on the total weight of solids in the negative electrode slurry.

The binder is a component that assists the bonding between the conductive material, the active material and the current collector, and is typically added in an amount of 1 to 30 wt % based on the total weight of solids in the negative electrode slurry. Examples of such binders include polyvinylidene fluoride, polyvinyl alcohol, carboxymethylcellulose, starch, hydroxypropylcellulose, regenerated cellulose, polyvinylpyrrolidone, tetrafluoroethylene, polyethylene, polypropylene, ethylene-propylene-diene polymer, sulfonated ethylene-propylene-diene terpolymer, styrene butadiene rubber, fluorine rubber, and various copolymers thereof.

The conductive material is a component for further improving the conductivity of the negative electrode active material, and may be added in an amount of 1 to 20 wt % based on the total weight of solids in the negative electrode slurry. Such a conductive material is not particularly limited as long as it has electrical conductivity without causing a chemical change in the battery, and examples thereof include graphite such as natural graphite and artificial graphite; carbon black such as acetylene black, Ketjen black, channel black, furnace black, lamp black, and thermalblack; conductive fibers such as carbon fiber and metal fiber; conductive powders such as carbon fluoride, aluminum and nickel powder; conductive whiskey such as zinc oxide and potassium titanate; conductive metal oxides such as titanium oxide; and conductive materials such as polyphenylene derivatives and the like.

The solvent may include water or an organic solvent such as NMP or alcohol, and may be used in an amount that becomes a desirable viscosity when the negative electrode active material and optionally a binder and a conductive material are included. For example, the concentration of the solids in the slurry containing the negative electrode active material and, optionally, the binder and the conductive material may be in an amount of 50 wt % to 75 wt %, preferably 50 wt % to 65 wt %.

An organic separator or an organic and inorganic composite separator can be used as the separator.

A porous polymer film, which is prepared by a polyolefin-based polymer such as ethylene homopolymer, propylene homopolymer, ethylene/butene copolymer, ethylene/hexene copolymer, and ethylene/methacrylate copolymer, may be used alone, or a laminate thereof may be used as the organic separator. Alternatively, a general porous non-woven fabric such as a non-woven fabric made of a glass fiber having a high melting point, a polyethylene terephthalate fiber, etc. may be used as the organic separator.

An organic/inorganic complex porous safety-reinforcing separator (SRS), which is obtained as a porous coating layer containing inorganic particles and a binder polymer is applied on the porous polyolefin-based separator substrate, may be used as the organic and inorganic complex separator.

Inorganic particles having lithium ion transfer capability or mixtures thereof are preferably used as the inorganic particles, and some examples of the inorganic particles include one or a mixture of two or more selected from the group consisting of $BaTiO_3$, $BaTiO_3$, $Pb(Zr,Ti)O_3$ (PZT), $Pb_{1-x}La_xZr_{1-y}Ti_yO_3$ (PLZT, herein, $0<x<1$, $0<y<1$), $HfO_2$, $SrTiO_3$, $SnO_2$, $CeO_2$, MgO, NiO, CaO, ZnO, $ZrO_2$, $Y_2O_3$, $Al_2O_3$, $TiO_2$, SiC, and a mixture thereof.

The outer shape of the lithium secondary battery of the present invention is not particularly limited, but the lithium secondary battery may have a cylindrical shape using a can, a prismatic shape, a pouch shape or a coin shape.

Hereinafter, the present invention will be described in detail with reference to examples. However, the embodiments according to the present invention may be modified into various other forms, and the scope of the present invention should not be construed as being limited to the embodiments described below. The embodiments of the present invention are provided to more fully describe the present invention to those skilled in the art.

Example 1

(Preparation of Non-Aqueous Electrolyte Solution)

Ethylene carbonate (EC) and ethylmethyl carbonate (EMC) were mixed at the volume ratio of 30:70, and $LiPF_6$ and LiFSI were dissolved therein to have 1.0 M concentration of $LiPF_6$ and 0.2M concentration of LiFSI, to thereby manufacture a non-aqueous organic solvent. A non-aqueous electrolyte solution of the present invention was manufactured by adding 0.3 wt % of a compound represented by chemical formula 1a, to the non-aqueous organic solvent.

[Chemical formula 1a]

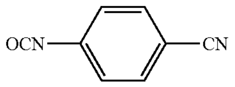

(Electrode Preparation)

A positive electrode active material slurry (50 wt % solids concentration) was manufactured by adding a positive electrode active material ($Li(Ni_{0.6}Mn_{0.2}Co_{0.2})O_2$), a conductive material (carbon black) and a binder (polyvinylidene fluoride) at the weight ratio of 90:5:5, to N-methyl-2-pyrrolidone (NMP) as a solvent. A positive electrode was manufactured by applying the positive electrode active material slurry on a positive electrode current collector (Al film) having a thickness of 100 μm, then drying the slurry and roll-pressing the positive electrode current collector.

A negative electrode active material slurry (60 wt % of solids concentration) was manufactured by adding a negative electrode active material (artificial graphite), a binder (PVDF), and a conductive material (carbon black) at the weight ratio of 95:2:3, to NMP as a solvent. A negative electrode was manufactured by applying the negative electrode active material slurry on a negative electrode current collector (Cu film) having a thickness of 100 μm, then drying the slurry and roll-pressing the negative electrode current collector.

(Preparation of Secondary Battery)

A positive electrode and a negative electrode, which were manufactured in the above-described manner, were sequentially laminated together with a polyethylene porous film, to thereby manufacture an electrode assembly. Thereafter, the electrode assembly was put in a battery case, and the non-aqueous electrolyte solution was injected into the battery case, which was then sealed, to thereby manufacture a lithium secondary battery (battery capacity 200 mAh).

Examples 2 to 10

A non-aqueous electrolyte solution was prepared by changing the kind and amount of the first additive and the kind and amount of the second additive in the example 1 as shown in Table 1. Further, an electrode and a secondary battery were prepared in the same manner as in Example 1.

Comparative Examples 1 to 4

A non-aqueous electrolyte solution was prepared by changing the kind and amount of the first additive and the kind and amount of the second additive in the example 1 as shown in Table 1. Further, an electrode and a secondary battery were prepared in the same manner as in Example 1.

[Chemical formula 2a]

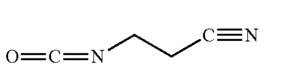

[Chemical formula 2b]

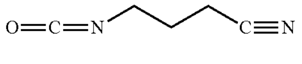

Experimental Example 1: Evaluation of Capacity Retention Rate after High Temperature (60° C.) Storage Formation was performed for lithium secondary batteries, which were manufactured in examples 1 to 10, and lithium secondary batteries, which were manufactured in comparative examples 1 to 4, at the condition of 200 mA current (0.1C rate), and gas in the battery was then removed (degassing process). Thereafter, the charging was performed at conditions of 0.33C/4.2V constant current/constant voltage (CC/CV) and 4.2V/0.05C at 25° C., and discharging was performed at the condition of 0.33C/2.5V constant current. At this time, the discharge capacity, which was measured using PNE-0506 charge-discharge device (manufacturer: PNE Solution Co., Ltd., 5V, 6A), was defined as the initial discharge capacity.

Thereafter, each secondary battery was set to SOC 100% charge state and was then stored at 60° C. for 12 weeks.

Thereafter, charging was performed at conditions of 0.33C/4.2V constant current/constant voltage (CC/CV) and 4.2V/0.05C at 25° C., and discharging was performed at the condition of 0.33C/2.5V constant current. Further, the discharge capacity was measured using PNE-0506 charge-discharge device (manufacturer: PNE Solution Co., Ltd., 5V, 6A). At this time, the measured capacity was defined as the discharge capacity after high temperature storage.

The measured initial discharge capacity and the discharge capacity after high temperature storage were applied to the following formula (1) to thereby measure the capacity retention rate, and the result was shown in Table 1 below.

Capacity retention rate (%)=(Discharge capacity after high temperature storage/Initial discharge capacity)×100 Formula (1)

Referring to Table 1 below, the capacity retention rate after high temperature storage of the lithium secondary battery of examples 1 to 10 including the first additive of the present invention was equal to or more excellent than that of the comparative examples 1 to 4.

Experimental Example 2: Evaluation of Resistance Increase Rate after High Temperature (60° C.) Storage Formation was performed for lithium secondary batteries, which were manufactured in examples 1 to 10, and lithium secondary batteries, which were manufactured in comparative examples 1 to 4, at the condition of 20 mA current (0.1C rate), and gas in the battery was then removed (degassing process). Thereafter, charging was performed at conditions of 0.33C/4.2V constant current/constant voltage (CC/CV) and 4.2V/0.05C at 25° C., and discharging was performed at 0.33C, to thereby allow the battery to be at SOC 50% state. Thereafter, the initial resistance value was obtained by measuring a voltage drop, which was shown in a state that discharging pulses were given with 2.5C constant current for 10 seconds, using PNE-0506 charge-discharge device (manufacturer: PNE Solution Co., Ltd., 5V, 6A). Thereafter, charging was performed at conditions of 0.33 CC/4.2V constant current/constant voltage (CC/CV) and 4.2V/0.05C at the voltage operating range of 2.5 to 4.2V, to thereby charge the battery to SOC 100% state.

Thereafter, each secondary battery was left alone at 60° C. for 12 weeks.

Thereafter, charging was performed at conditions of 0.33C/4.2V constant current/constant voltage (CC/CV) and 4.2V/0.05C and discharging was performed at 0.33C using PNE-0506 charge-discharge device (manufacturer: PNE Solution Co., Ltd., 5V, 6A), to thereby allow the battery to be at SOC 50% state. Thereafter, the resistance value after high temperature storage was obtained by measuring a voltage drop which was shown in a state that discharging pulses were given with 2.5C constant current for 30 seconds.

The resistance increase rate (%) for each secondary battery was calculated from the ratio of a resistance, which increased after high temperature storage compared to the initial resistance using the following formula (2), and the result was shown in Table 1 below.

Resistance increase rate (%)={(resistance after high temperature storage−initial resistance)/initial resistance}×100  Formula (2)

Referring to Table 1 below, the resistance increase rate of secondary batteries after high temperature storage of examples 1 to 10 is much better than those of the secondary batteries of comparative examples 1 to 4. Further, the resistance increase rate of secondary batteries of examples 1 to 4, in which a compound represented by chemical formula 1a was applied as the first additive, was smaller than the resistance increase rate of examples 5 to 8, in which a compound represented by chemical formula 1b was applied as the first additive, and comparative examples 2 to 3.

Experimental Example 3: Measurement of Lifespan Capacity Retention Rate (45° C.)

Formation was performed for lithium secondary batteries, which were manufactured in examples 1 to 10, and lithium secondary batteries, which were manufactured in comparative examples 1 to 4, at the condition of 20 mA current (0.1C rate), and gas in the battery was then removed (degassing process). Thereafter, the charging at conditions of 4.2V, 66 mA (0.33C, 0.05C cut-off) CC/CV and the discharging at conditions of 2.5V, 66 mA (0.33C) CC were performed 200 times at a high temperature of 45° C., respectively. Herein, the discharge capacity after one time and the discharge capacity after 200 times were measured using PNE-0506 charge-discharge device (manufacturer: PNE Solution Co., Ltd., 5V, 6A), and the discharge capacity after one time was set as the initial capacity. Thereafter, the capacity retention rate was calculated by the formula (1) by comparing the discharge capacity after 200 times with the initial capacity (100%), and the result was shown in Table 1.

Experimental Example 4: Measurement of Resistance Increase Rate at High Temperature (45° C.)

Formation was performed for lithium secondary batteries, which were manufactured in examples 1 to 10, and lithium secondary batteries, which were manufactured in comparative examples 1 to 4, at the condition of 20 mA current (0.1C rate), and gas in the battery was then removed (degassing process). After moving the degassed lithium secondary battery to a charge-discharge device at a room temperature (25° C.), charging with constant current/constant voltage was performed up to 4.2V at 0.3C and cut-off charging was performed at 0.05C, and discharging was performed to 2.5V at 0.33C. After performing charge and discharge 3 times, respectively, the battery was set to SOC 50% based on the discharge capacity. At this time, DC internal resistance was measured through a voltage drop which was shown when discharge pulses were given with 5A (2.5C) for 10 seconds (PNE-0506 charge-discharge device (manufacturer: PNE Solution Co., Ltd., 5V, 6A)), and the resistance at this time was set as the internal resistance.

Thereafter, the charging at conditions of 4.2V, 66 mA (0.33C, 0.05C cut-off) CC/CV and the discharging at conditions of 2.5V, 66 mA (0.33C) CC were performed 200 times at a high temperature of 45° C., respectively. Thereafter, the lithium secondary battery was moved to a charge-discharge device at a room temperature (25° C.), and SOC 50% was set. After that, the DC internal resistance was measured through a voltage drop which was shown when discharge pulses were given with 2.5C for 10 seconds (PNE-0506 charge-discharge device (manufacturer: PNE Solution Co., Ltd., 5V, 6A). By comparing this with the initial resistance (0%), the resistance increase rate (%) was calculated according to the above formula (2), and the result was shown in Table 1 below.

TABLE 1

| | First additive | | Second additive | | After high temperature storage at 60° C. for 12 weeks | | 45° C. 200 cycles | |
|---|---|---|---|---|---|---|---|---|
| | type | Content (wt %) | type | Content (wt %) | Capacity retention rate (%) | Resistance increase rate (%) | Capacity retention rate (%) | Resistance increase rate (%) |
| Example 1 | Chemical formula 1a | 0.3 | VC/PS/$LiBF_4$ | 1.0/0.6/0.2 | 90.5 | 42.5 | 92.7 | 3.1 |
| Example 2 | Chemical formula 1a | 0.6 | VC/PS/$LiBF_4$ | 1.0/0.6/0.2 | 92.0 | 40.3 | 92.8 | 2.9 |
| Example 3 | Chemical formula 1a | 0.9 | VC/PS/$LiBF_4$ | 1.0/0.6/0.2 | 90.2 | 47.4 | 92.6 | 4.3 |
| Example 4 | Chemical formula 1a | 1.2 | VC/PS/$LiBF_4$ | 1.0/0.6/0.2 | 86.2 | 54.1 | 91.7 | 6.1 |
| Example 5 | Chemical formula 1b | 0.3 | VC/PS/$LiBF_4$ | 1.0/0.6/0.2 | 89.8 | 52.6 | 90.9 | 9.2 |
| Example 6 | Chemical formula 1b | 0.6 | VC/PS/$LiBF_4$ | 1.0/0.6/0.2 | 90.8 | 51.2 | 91.2 | 8.7 |
| Example 7 | Chemical formula 1b | 0.9 | VC/PS/$LiBF_4$ | 1.0/0.6/0.2 | 90.5 | 57.5 | 90.7 | 9.3 |
| Example 8 | Chemical formula 1b | 1.2 | VC/PS/$LiBF_4$ | 1.0/0.6/0.2 | 85.9 | 62.2 | 88.7 | 12.4 |

TABLE 1-continued

| | First additive | | Second additive | | After high temperature storage at 60° C. for 12 weeks | | 45° C. 200 cycles | |
|---|---|---|---|---|---|---|---|---|
| | type | Content (wt %) | type | Content (wt %) | Capacity retention rate (%) | Resistance increase rate (%) | Capacity retention rate (%) | Resistance increase rate (%) |
| Example 9 | Chemical formula 1a | 3.1 | VC/PS/$LiBF_4$ | 1.0/0.6/0.2 | 81.5 | 61.9 | 90.4 | 13.5 |
| Example 10 | Chemical formula 1a | 1.0 | — | — | 85.4 | 61.5 | 87.4 | 11.8 |
| Comparative Example 1 | — | — | VC/PS/$LiBF_4$ | 1.0/0.6/0.2 | 86.6 | 64.7 | 87.0 | 11.7 |
| Comparative Example 2 | Chemical formula 2a | 1.0 | VC/PS/$LiBF_4$ | 1.0/0.6/0.2 | 83.6 | 62.1 | 86.5 | 12.2 |
| Comparative Example 3 | Chemical formula 2b | 1.0 | VC/PS/$LiBF_4$ | 1.0/0.6/0.2 | 82.8 | 63.8 | 85.9 | 12.9 |
| Comparative Example 4 | Chemical formula 1a | 6.0 | VC/PS/$LiBF_4$ | 1.0/0.6/0.2 | 76.1 | 63.9 | 83.2 | 17.8 |

Referring to the above Table 1, secondary batteries of examples 1 to 10 including the first additive of the present invention have more excellent high temperature charge/discharge characteristics and characteristics after high temperature storage than those of secondary batteries of the comparative example 1.

Further, chemical formula 2a or 2b of additives of comparative examples 2 and 3 includes functional groups of the nitrile group and isocyanate group, but their high temperature characteristics and characteristics after high temperature storage are inferior to those of the additive (chemical formula 1a and chemical formula 1b) of the present invention.

Hence, it is seen that the non-aqueous electrolyte solution containing an additive of the present invention had excellent characteristics after high temperature storage and charge/discharge characteristics at a high temperature.

Experimental Example 5: Metal Elution Suppression Assessment Experiment

Secondary batteries of examples 2 and 6 and comparative example 1 were manufactured by attaching copper particles having a diameter of about 100 micrometers on a positive electrode when preparing the positive electrode. After performing formation for the manufactured lithium secondary batteries at the condition of 20 mA current (0.1C rate), respectively, gas in each battery was removed (degassing process). After full-charging the degassed secondary battery, the voltage according to time was measured, and the result is shown in the FIGURE.

Referring to the FIGURE, the voltage drop amount of the secondary battery according to the examples of the present invention was much smaller than that of the secondary battery of the comparative example 1. In particular, the voltage drop amount of the secondary battery of the example 2, in which the compound represented by chemical formula 1a was added, decreased, compared to the example 6 in which the compound represented by chemical formula 1b was added. The voltage drop amount decreased because the compound represented by chemical formula 1a showed more excellent effects of blocking metal elution.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

The invention claimed is:

1. A non-aqueous electrolyte solution for a lithium secondary battery, the non-aqueous electrolyte solution comprising:

a lithium salt;

an organic solvent;

a first additive; and a second additive, wherein the first additive is at least one a compounds represented by chemical formula 1a or chemical formula 1b, the first additive is contained in an amount of 0.1 to 3 wt % based on a total weight of the electrolyte solution, and the second additive comprises vinylene carbonate, propane sultone and $LiBF_4$:

[Chemical formula 1a]

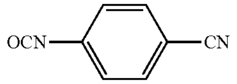

[Chemical formula 1b]

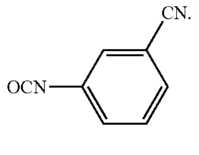

2. The non-aqueous electrolyte solution of claim 1, wherein the first additive is represented by chemical formula 1a.

3. The non-aqueous electrolyte solution of claim 1, wherein the second additive is contained in an amount of 0.01 to 10 wt % based on a total weight of the electrolyte solution.

4. The non-aqueous electrolyte solution of claim 1, wherein the organic solvent includes at least one of a carbonate compound, an ether compound, an ester compound, a ketone compound, or an alcohol compound.

5. A lithium secondary battery including: a positive electrode; a negative electrode; a separator; and the non-aqueous electrolyte solution for a lithium secondary battery according to claim 1.

* * * * *